Aug. 24, 1965  C. CHRISTIANSON  3,202,819
BETA AND GAMMA MEASURING APPARATUS FOR FLUIDS
Filed May 8, 1963  2 Sheets-Sheet 2
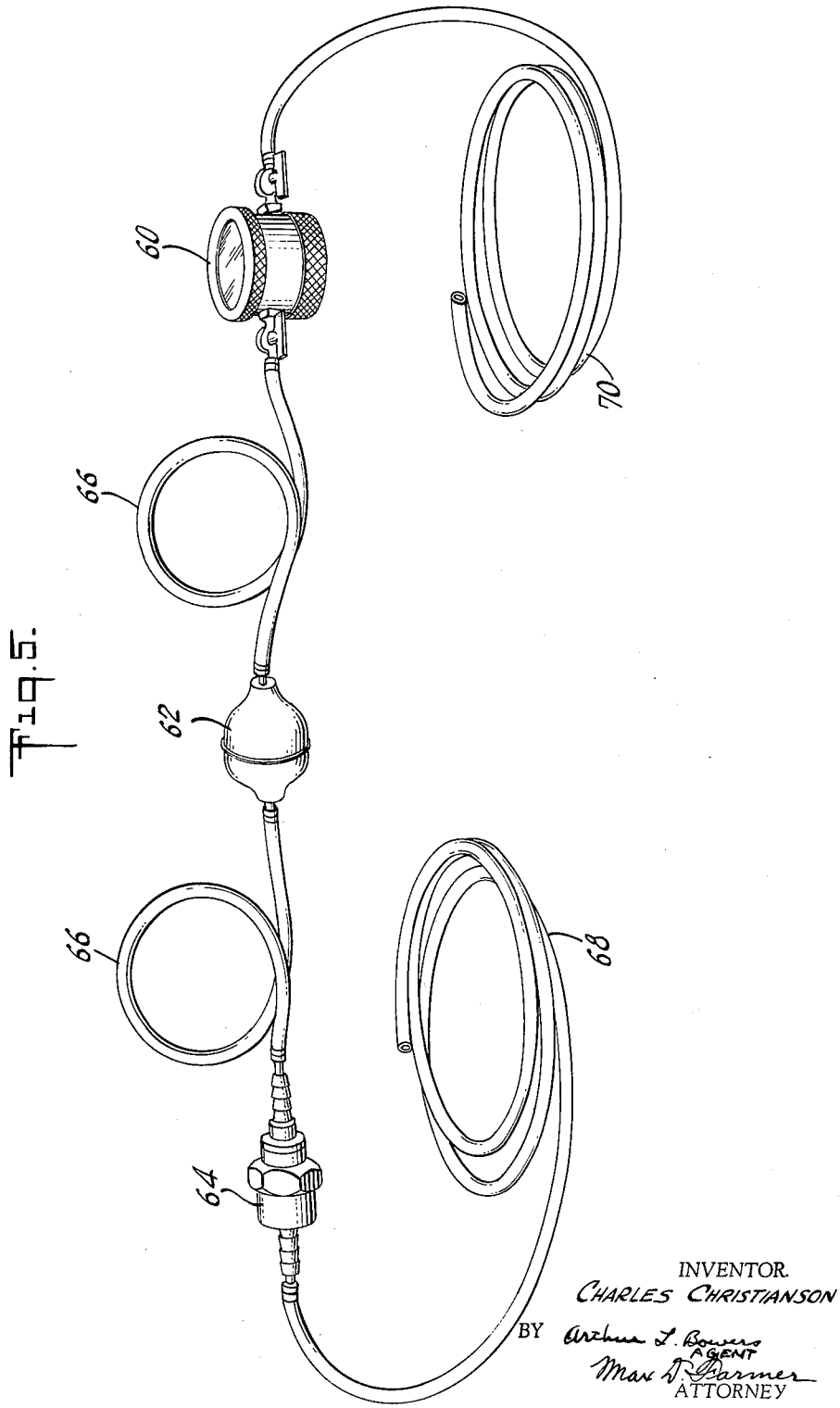
INVENTOR.
CHARLES CHRISTIANSON
BY United States Patent Office 3,202,819
Patented Aug. 24, 1965

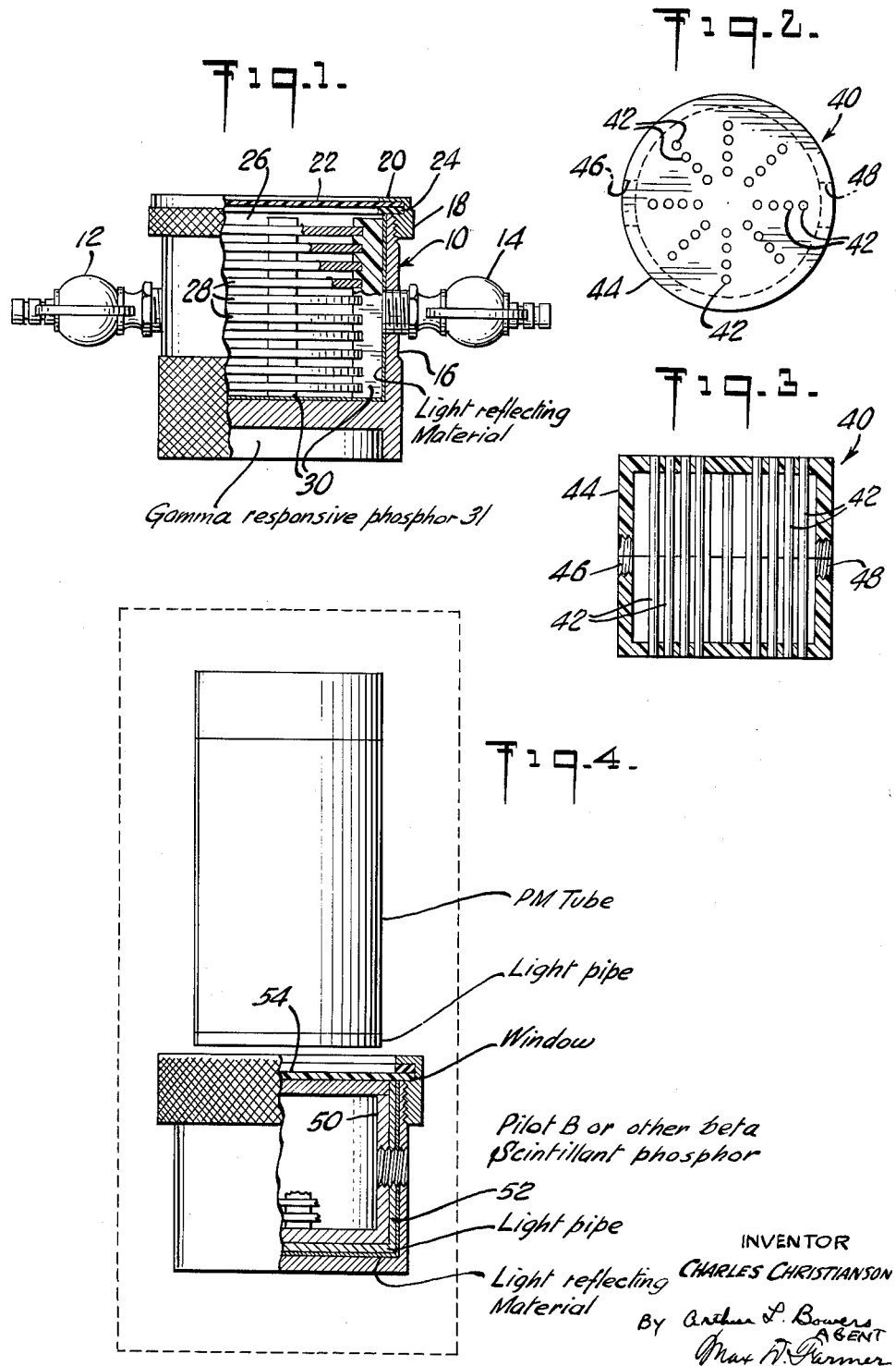

3,202,819
BETA AND GAMMA MEASURING APPARATUS FOR FLUIDS
Charles Christianson, New York, N.Y., assignor to the United States of America as represented by the Secretary of the Navy
Filed May 8, 1963, Ser. No. 279,687
8 Claims. (Cl. 250—71.5)
(Granted under Title 35, U.S. Code (1952), sec. 266)

The invention described herein may be manufactured and used by or for the Government of the United States of America for governmental purposes without the payment of any royalties therein or therefor.

This invention relates to collecting samples of fluids in which radioactive constituents are suspected, particularly gases which may contain radioactive gaseous byproducts of nuclear reactor operation, making measurements contributing toward identification of the radioactive constituent, and ascertaining the activity in the sample.

This invention is for use with radioactivity instrumentation known and used in the art, including an ionization type detector of radioactivity such as Geiger-Mueller tube or a scintillation type detector of radioactivity, such as a photomultiplier tube plus scintillant phosphor as beta or gamma detector, mounts plus lead shielding and light shielding for the detector and the radioactive sample, power source for energizing the detecting element, a scaler unit for registering ionization or scintillation counts and count rate, and electrical connection means between detecting element and scaler. In addition, the instrumentation may include a reference source for use in calibrating the instrumentation and an absorber set for selectively attenuating radioactivity emanations from more active samples toward the detector and as an aid in identifying unknown isotopes in the sample. One example of a reference source is described in copending patent application Serial Number 116,629, filed June 12, 1961, by Charles Christianson and Ralph Maggio for Radioactive Sourse Set. One example of a commercially available calibrated absorber set is marketed by Tracerlab of Boston, Massachusetts, and includes a set of twenty-five aluminum absorbers mounted in plastic rings. The absorbers cover a thickness range in milligrams from 0 to 1500 mg./cm.$^2$.

Radioactive gas as a constituent of the atmosphere is a health hazard. An example of circumstances leading to such health hazard is as follows. In the operation of pressurized water reactors argon-41 gas is formed through neutron reaction with the argon component of the air contained in the reactor coolant water. If there are defects in the boiler tubes, air in the reactor coolant water may leak into the steam system and thence find its way through condenser air ejectors into the air around the reactor site. Where high ventilation rates exchange the air with the outside atmosphere argon-41 gas does not reach sufficient concentration to be serious but it can be a serious airborne health hazard around reactors operating in confined air spaces. Also, ventilation notwithstanding, localized concentrations of sufficiently high activity may obtain in areas in the immediate vicinity of the engine room of a nuclear power plant that personnel should be denied access to those areas for as long as the hazard persists. Therefore, on nuclear submarines particularly, and in nuclear reactor sites generally it is necessary to collect and monitor at intervals, filtered air samples substantially free of particulate material to detect and measure radioactivity in the gaseous constituents of the atmosphere and identify and measure the concentration of radioactive gaseous constituents of the atmosphere. These areas where argon-41 may tend to concentrate must be monitored independently of the general atmosphere. In storage areas for radioactive gases and wherever radioactivity is known to exist or suspected, atmospheric samples must be collected for test.

There is a need for apparatus and methods for monitoring gases other than atmosphere. For example, the production of argon-41 by a pressurized water reactor can also be used as an index of reactor operation. During normal reactor operation, the concentration of argon-41 built up in the coolant water falls within known limits which are a function of the reactor operating parameters. When the activity level exceeds these limits, it may be indicative of abnormalities in the reactor's operation. Therefore, it is necessary to extract from the primary coolant samples of air trapped in the primary coolant and measure the radioactivity in the samples.

Argon-41 is not the only radioactive gas that may be produced in the primary coolant of a pressurized water reactor. Fission gases krypton-85 and xenon-133–135 may be produced when there is rupture of a fuel rod in the reactor. These fission gases become constituents of the gas contained in the primary coolant along with argon-41. By ascertaining the correct value of total activity from a measured count rate of a sample and the presence and concentration of these fission product gases in the coolant and in the atmosphere there is obtained an indication of abnormalities in the reactor. If the measured count rate of a sample is converted to total activity on the assumption that a particular gas, e.g., argon-41 is the radioactive constituent, results are inaccurate.

Radioactive gas monitoring procedures are necessary not only for safeguarding health but for detecting problems in nuclear equipment.

The activity in a gas sample may be beta or gamma or both and the intensity may range from very low to very high levels. Sampling means currently available is not suitable for a wide range of possibilities.

One prior art method of monitoring for gaseous radioactivity includes continuously flowing gas through an ionization chamber. A disadvantage of this method is that it requires elaborate electronics and that moisture, aerosols, and particulate matter in the continuous flow introduces substantial error. Furthermore, this method did not lend itself to a decay scheme analysis and does not enable one to be subjected to a variety of measuring techniques.

An object of this invention is to make discrete as opposed to continuous measurements of gaseous radioactivity, to measure beta and gamma content of a given sample separately, to measure low or high concentrations of radioactivity in a sample, and to obtain a decay scheme analysis for use in identifying radioactive constituents in the sample.

A further object is to provide a simple, inexpensive, efficient, portable apparatus and method for collecting atmosphere or other gas sample substantially free of particulate matter and containing radioactive gases which are byproducts of nuclear reactor operation or a gas sample containing radioactive gas from any other source for measurements of radioactivity in the sample and for identification of the radioactive gaseous constituents.

A further object is to provide a device having a broad range of utility, e.g., where the concentration of radioactive gas in the gas sample may be anywhere within a very wide range of concentration and wherein the sample may manifest beta activity anywhere within a wide range and/or gamma activity anywhere within a wide range, and wherein the beta or gamma energy level falls anywhere within a wide range.

A further object is to provide an apparatus for use in measuring beta activity of various radioactive gas samples, e.g., gas samples containing low energy beta emitting gas such as carbon-14 or tritium, or radioactive isotopes of argon, krypton, xenon, or any other radioactive gas.

A further object is to collect a gaseous or liquid sample, obtain a count rate on the sample, identify the radioactive constituent(s), and convert the count rate into activity rate, without need for processing the sample before measurement.

A further object is to improve radioactive measurement techniques on fluid samples.

A further object is to facilitate, and increase the accuracy of measurement of beta and gamma activity in a fluid sample and generally improve sampling devices and techniques.

Other objects an advantages will appear from the following description of an example of the invention, and the novel features will be particularly pointed out in the appended claims.

The embodiment of the invention shown in FIG. 1 includes a fluid sampling cup 10 having two spaced pet cock fittings 12 and 14 secured in the peripheral wall 16 to provide controllable fluid passages into and out of the cup 10. A screw cap 18 including a flanged ring 20 seating a thin beta and light transparent plastic phosphor window 22 and an elastomeric gasket ring 24 seals the open end of the cup 10 and together therewith confines a sample chamber 26. A stack of light transparent beta sensitive scintillant phosphor wafer disks 28 assembled on spacers 30 in coaxial, equally spaced, parallel relationship are nested in the chamber 26. The outside bottom face of the cup 10 is formed with a circular recess in which is seated a gamma responsive phosphor 31, or an attenuation disk, not shown, overlaid by a gamma responsive phosphor disk. Information on various phosphor scintillants is included in the literature; for example, information on this subject is included in Chapter III–C of Radiation Dosimetry by Hine and Brownell published by Academic Press in 1956. Phosphors in the disk shapes shown and described are marketed commercially.

The cup is preferably of stainless steel because stainless steel is easier to clean for decontamination, has good back scatter properties for beta, thereby contributing to higher counting efficiency and has strength and durability. The inside surface is polished for reflecting light scintillations. The inner surface of cup 10 may be coated with a film of light reflecting material. The outside dimensions of the assembly is limited to the clearance available in the shielded instrument housing for the detector and the sampler. A sampler confining a 100 cc. chamber or less is satisfactory for this purpose though in no sense critical. The sample occupying volume of the collection chamber is ascertained accurately from the geometry or by filling the chamber with a measured quantity of distilled water.

A suitable gamma phosphor is anthracene which may be obtained commercially from Pilot Chemicals of Watertown, Mass., National Radiac of New Jersey, and National Radiac, Inc., Newark, New Jersey. A suitable beta phosphor is Pilot Scintillator B described in U.S. Patent No. 2,710,284 obtainable from Pilot Chemicals, Inc., of Watertown, Mass. The supporting spacers for the wafer disks 28 may be of any rigid material but preferably are of a light transparent light conducting material such as methyl methacrylate marketed under the trademark Lucite, for higher scintillation counting efficiency. The stack of phosphor disks are removable for cleaning, decontamination and replacement. The volume of the collection chamber 26 is known with and without the stack of phosphor wafer disks in place, since the sampler may be used for G-M tube beta counting and or scintillation counting.

One consideration determining the choice of phosphor wafer thickness is counting efficiency. A larger number of thinner disks have more surface area exposed to the gas sample while thicker disks provide more light output per scintillation but have less surface in contact with the sample. For argon-41, Pilot B wafers 10 millimeters thick provides good counting efficiency. The window 22 may include a Mylar film which is light transparent, beta transparent, and tough enough to withstand rough handling and a substantial pressure differential during the step incident to collecting a sample. Mylar is a Du Pont trademark for a polyester film. Beta counting with G-M detector does not require the scintillant wafers or scintillant material in the window 22. Where scintillation techniques for beta counting are not required, the wafer stack is omitted and a window free of scintillant material may be used.

A 100 cubic centimeter capacity sampler as described can be used to measure argon-41 down to a beta concentration of $1 \times 10^{-6}$ microcuries/cubic centimeter. With an aperture mask to lower the efficiency of measurement, beta concentrations of several microcuries/cubic centimeter can be measured. If the sampler is turned over the gamma content of argon-41 may be measured up to concentrations of about 30 microcuries/cubic centimeter. A sampler according to this invention with a comparatively small capacity chamber may be used for sampling very active gas.

The sampler must be separately calibrated for a beta ionization counting system or a beta scintillation counting system or a gamma ionization counting system or a gamma scintillation counting system or any combination thereof for each radioactive gas of interest. By applying all or any combination of the above counting systems to a sample, and by plotting a decay curve of the sample and by using calibrated absorbers, identity of a radioactive constituent can be specifically established or narrowed down to few possibilities. By scintillation counting low activity beta and gamma can be measured efficiently. If a sample is found to emit gamma only or beta only, this fact narrows down the possibilities considerably. The relationship of beta and gamma narrows the possibilities further.

In FIGS. 2 and 3, there is shown an alternative beta sensitive phosphor assembly 40. The assembly in FIGS. 2 and 3 comprises a star-like array of parallel-supported beta sensitive phosphor rods 42, e.g., Pilot B, in a light transparent light-conducting plastic housing 44, e.g., methyl methacrylate having openings 46 and 48 for registration with the petcock fittings 12 and 14 in FIG. 1. The housing is made in two halves and cemented at assembly. The rods are oriented normal to the window and channel light longitudinally. The rods can be obtained commercially in a range of diameters. Optimum diameter and spacing for efficiency is related to the energy put out by the sample.

In FIG. 4, there is shown an embodiment of the collection chamber having the same cup structure with inner reflecting surface as described previously and including a liner of light-transparent beta sensitive phosphor 50, e.g., Pilot B about 10 millimeters thick and a cup 52 of light-conducting light-transparent material, e.g., Lucite several millimeters thick sandwiched between the phosphor 50 and the outer cup 10. Both the phosphor cup 50 and sandwiched cup 52 abut the window 54. The embodiment shown in FIG. 4 may be employed in combination with the removable beta sensitive phosphor arrangements shown in FIGS. 1 and 2.

In the scintillation arrangements, the lower limit of the amount distributed of scintillation phosphor material is the amount required to produce sufficient light output in the presence of a sample of predetermined beta and gamma activity to exceed the background noise in the photomultiplier tube and circuit. The upper limit of the amount of distributed scintillation phosphor material is the amount which will saturate the detector in the presence of a sample of predetermined beta and gamma activity.

In designing a sampler apparatus in accordance with this invention, it has been found that there is convenience in handling a sampler whose diameter and height are on the order of two inches. The window diameter and gamma responsive phosphor disk should be between 1½–2 inches in diameter for use with commercial photomultipliers.

Any of the embodiments of the invention may be calibrated in a selected counting equipment and geometry with a particular radioactive gas, e.g., argon-41 as follows. Argon-41 is obtained by irradiating argon-40 in a neutron flux field. A measured quantity of argon-40 can be completely converted to argon-41 by exposure to a neutron flux field of known intensity for a time period which is a function of the quantity of gas and the intensity of neutron flux field. The starting time for decay is taken as the instant the irradiated gas is removed from the neutron flux field. The activity per unit volume, half life, and decay curves of pure argon-41 as well as of other radioactive gases are available in the literature. If the decay curves cannot be readily located they are easily plotted on semi-log paper as straight lines. The chamber to be calibrated is evacuated as completely as possible, e.g., to a vacuum of less than 1% of ambient pressure. The argon-41 is diluted with air to a very low predetermined concentration to approximate the order magnitude of argon-41 concentration that may be encountered. The evacuated collection chamber is charged with the diluted argon-41 at measured room temperature and measured atmospheric pressure in the counting environment. The device is mounted in light shielded and ionizing radiation shielded housing in predetermined geometry relative to the scintillation or ionization counting element. The time is recorded and the scintillation or ionization count rate is taken. The background count rate sensed by the equipment is measured. Correction is made for the background. Since the dilution and the decay time of the sample is known, the total activity of the sample at the time the count rate is taken is known. The deficiency of the system is determined from the ratio of count rate to total activity. Then when the device is filled with air containing a trace of argon-41 and the count rate of the sample is taken with the same instrumentation, the concentration of argon-41 and the total activity in the air is ascertained. The collection chambers described permit beta and gamma of the same sample to be determined by ionization and scintillation counting. By comparison of beta and gamma activity of a sample, the identity of the gaseous contaminant(s) is narrowed appreciably. The identity is narrowed further by plotting beta and gamma decay rates and by comparing the effect of various calibrated absorbers on the count rates.

I carried out a calibration procedure as follows. A 2 cc. quartz ampule of spectroscopically pure argon-40 at atmospheric pressure was purchased commercially from a gas supplier, e.g., Linde Division of Union Carbide. The ampule was sent to Brookhaven National Laboratory where is was placed in a known neutron flux field in the core of a reactor for a predetermined time sufficient for the known neutron flux field to convert the known quantity of the argon-40 completely to argon-41. The time that the ampule was removed from the neutron flux field was recorded. When the ampule was returned to me I placed it in a clean steel chamber of known volume, approximately 1 cubic foot having an arrangement accessible from outside the chamber for rupturing an ampule in the chamber. I sealed the chamber, evacuated the chamber to substantially complete vacuum, ruptured the ampule and then admitted dry air at room temperature into the chamber to atmospheric pressure. I evacuated the sampler and then coupled the sampler to the large steel chamber to fill the chamber with gas from the 1 cubic foot steel chamber. With petcocks closed I proceeded to obtain beta and gamma counts as described.

In use, the residual volume of the housing chamber is filled with a gas or liquid sample. One method of introducing a sample into the housing chamber is to close both petcocks, couple one of the petcocks to an evacuation device and the other petcock to the source of the sample, open the petcock coupled to the evacuation device, operate the evacuation device to evacuate the housing chamber, close the petcock coupled to evacuation device and open the other petcock coupled to the source of the sample until the chamber is filled with the sample. Another method of introducing the sample is to flow the sample into one petcock and out the other to flush the chamber and then to close the exhaust petcock and inlet petcock in sequence. The evacuation device may be a rubber hand bulb or a small pump to force or draw the sample into or through the chamber. These methods may be used for sampling ambient atmosphere, reactor coolant, gaseous material in the reactor coolant, or other suspect fluid.

In FIG. 5, there is shown one arrangement for filling a collection chamber in accordance with this invention with a sample. The collection chamber 60 is connected in series with an elastomeric squeeze bulb 62 including a check valve, not shown, and a filter assembly 64 for removing particulate matter from gas urged by actuation of the squeeze bulb 62 to flow to the collection chamber. Flexible tubing 66 joins the components. Lengths of flexible tubing 68 and 70 are joined to the collection chamber 60 and filter 64 when samples are taken from otherwise inaccessible or unsafe areas. When a sample is taken with the arrangement shown in FIG. 5, both petcocks of the collection chamber 60 are opened and the squeeze bulb is squeezed 10 or more times depending upon relative volumes of sampler and squeeze bulb to flush the chamber free of the gas previously contained in the chamber and then the petcocks are both closed and the collection chamber is removed to the counting equipment.

The collection chamber may be evacuated and/or flushed before filling the chamber with the sample.

It will be understood that various changes in the details, materials and arrangements of parts (and steps), which have been herein described and illustrated in order to explain the nature of the invention, may be made by those skilled in the art within the principle and scope of the invention as expressed in the appended claims.

I claim:

1. Sampler apparatus for use in detecting beta and gamma radiation in a fluid comprising:
    (a) a housing confining a chamber and including as part of the housing wall a window transparent to beta radiation and a housing wall portion opaque to beta radiation and energy in the visible spectrum remote from the window,
    (b) a gamma responsive phosphor secured to the exterior of the housing wall portion opaque to beta radiation and energy in the visible spectrum, and
    (c) means on said housing and in communication with the chamber for use in filling the chamber with a fluid sample.

2. Sampler apparatus for use in detecting beta and gamma radiation in a fluid comprising:
    (a) a housing confining a chamber and including as part of the housing wall a window transparent to beta radiation and energy in the visible spectrum and containing a beta responsive phosphor, and a housing wall portion opaque to beta radiation and energy in the visible spectrum remote from the window,
    (b) said housing including within the chamber a beta responsive phosphor whose scintillations are visible through said window,
    (c) a gamma responsive phosphor secured to the exterior of the housing wall portion opaque to beta radiation, and
    (d) means on said housing and in communication with the chamber for use in filling the chamber with a fluid sample.

3. Sampler apparatus for use in detecting beta and gamma radiation in a fluid comprising:
(a) a cylindrical housing confining a chamber,
(b) one end wall of the housing being a screw cap detachably sealing the chamber,
(c) said screw cap including a thin plastic beta responsive phosphor window transparent to beta radiation and energy in the visible spectrum,
(d) said housing except for said window being opaque to beta radiation and energy in the visible spectrum and including within the chamber a light transparent beta responsive phosphor which scintillates in response to incident beta radiation, which scintillations are visible through said window,
(e) a gamma responsive phosphor secured to the exterior of the housing wall opposite said window, and
(f) means on said housing and in communication with the chamber for use in filling the chamber with a fluid sample.

4. Sampler apparatus as defined in claim 3, wherein the beta responsive phosphor included in said housing is in the form of a stack of spaced disks and is supported substantially coaxially with said housing.

5. Sampler apparatus as defined in claim 4, wherein the beta responsive phosphor included in said housing is a plurality of spaced beta responsive light conducting phosphor rods supported parallel to the axis of the housin light transparent light conducting supports.

6. Sampler apparatus for use in detecting ionizing radiation in a gas comprising:
(a) a cylindrical steel cup having an efficient beta back scattering inner surface,
(b) the peripheral wall of the cup having two openings,
(c) a petcock fitting sealed into each of the openings and extending outwardly of the cup,
(d) a plurality of light transparent beta responsive phosphor discs supported in stacked spaced apart relationship in said cup and coaxial therewith,
(e) a screw cap detachably sealing the open end of the cup and together therewith confining a chamber,
(f) said cup having a light transparent beta transparent beta responsive phosphor window, said cup having a circular recess in the outer face of the bottom of the cup, and a gamma responsive phosphor disk secured in the recess.

7. Sampler apparatus for use in detecting ionizing radiation in a gas comprising:
(a) a steel cup having an efficient beta back scattering inner surface,
(b) the peripheral wall of the cup having two openings,
(c) a petcock fitting sealed into each of the openings and extending outwardly of the cup,
(d) a disk of a gamma responsive phosphor secured to the outer surface of the bottom of the cup,
(e) a screw cap detachably sealing the open end of the cup and together therewith confining a chamber,
(f) said cap having a light transparent window, and a beta responsive phosphor carried by at least one of said cup and screw cap for exposure to beta radiation in the chamber.

8. Sampler apparatus for use in detecting ionizing radiation in a fluid comprising:
(a) a housing confining a chamber and including as part of the wall a transparent window,
(b) said housing including a phosphor which scintillates in response to beta radiation within the chamber,
(c) and a phosphor secured to the outer surface of the housing wall opposite the window,
(d) said housing wall other than the window being impervious to beta radiation.

References Cited by the Examiner

UNITED STATES PATENTS

| | | | |
|---|---|---|---|
| 2,841,715 | 7/58 | Schultz | 250—71.5 |
| 2,855,520 | 10/58 | Stoddart | 250—71.5 |
| 2,892,086 | 1/59 | Carter | 250—43.5 |
| 2,978,587 | 4/61 | Forro | 250—71.5 |
| 2,979,620 | 4/61 | Bradshaw | 250—83.6 |
| 3,076,093 | 1/63 | Kiesel | 250—83.6 |
| 3,114,834 | 12/63 | Thompson | 250—83.6 |

RALPH G. NILSON, *Primary Examiner.*
JAMES W. LAWRENCE, *Examiner.*